April 15, 1941.   S. W. BATH   2,238,515
INTERNAL GAUGE FOR SPACING HOLES
Filed April 8, 1940   2 Sheets-Sheet 1
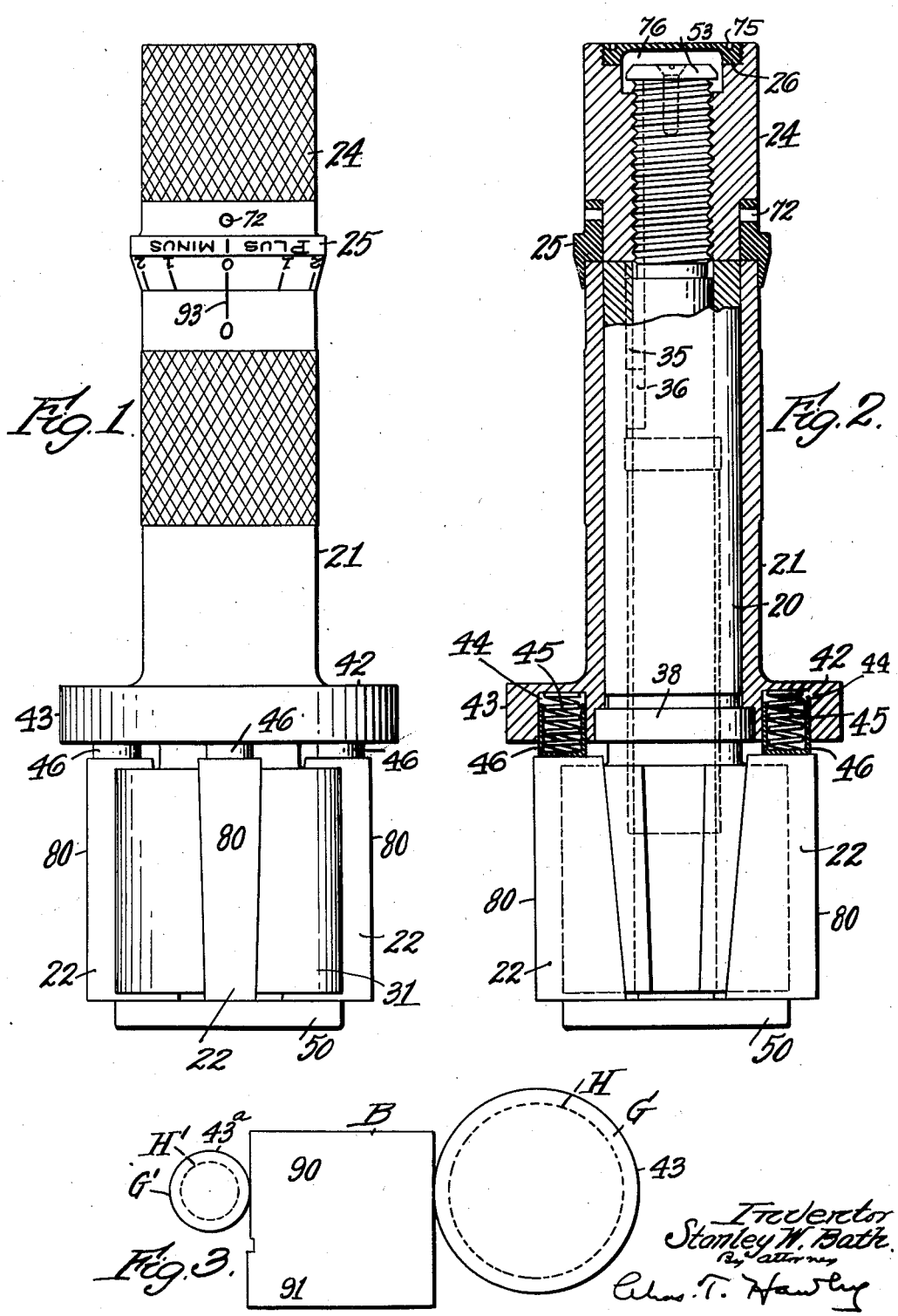

April 15, 1941. S. W. BATH 2,238,515
INTERNAL GAUGE FOR SPACING HOLES
Filed April 8, 1940 2 Sheets-Sheet 2
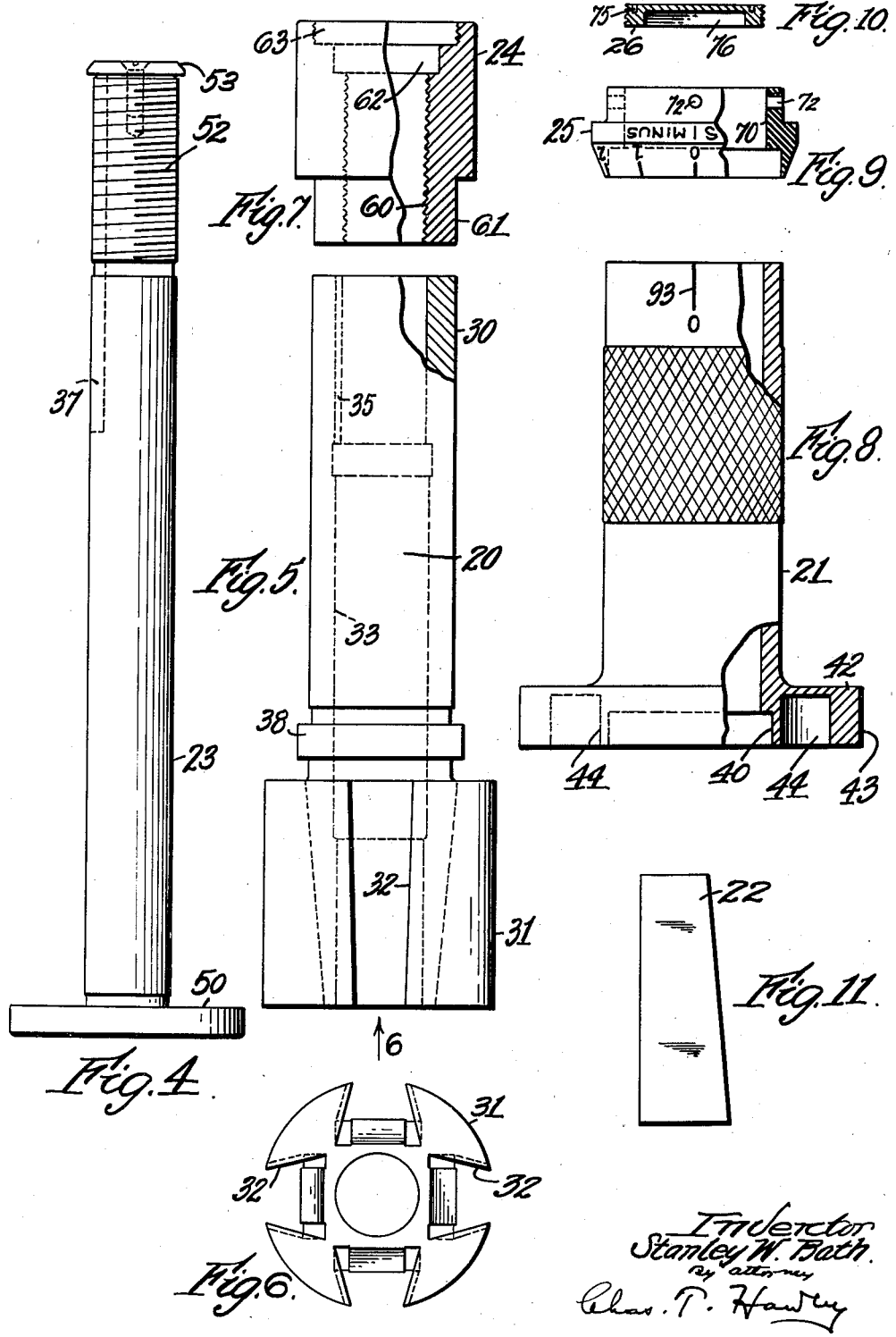
Inventor
Stanley W. Bath
by attorney
Chas. T. Hawley Patented Apr. 15, 1941

2,238,515

UNITED STATES PATENT OFFICE 2,238,515

INTERNAL GAUGE FOR SPACING HOLES

Stanley W. Bath, Shrewsbury, Mass., assignor to John Bath & Company, Worcester, Mass., a corporation of Massachusetts Application April 8, 1940, Serial No. 328,465

4 Claims. (Cl. 33—178)

This invention relates to internal gauges used in machine manufacture. It is at times necessary to accurately determine the distance between the axes of two parallel holes in a machine part, and my improved gauge is particularly designed for use in checking the axis spacing.

More specifically, I provide an adjustable internal gauge in which the adjustable gauge bars are maintained at all times with their gauging surfaces concentric with a reference surface fixed at the outside of the gauge body member.

My invention further relates to arrangements and combinations of parts which will be hereinafter described and more particularly pointed out in the appended claims.

A preferred form of the invention is shown in the drawings, in which

Fig. 1 is a front elevation of my improved gauge;

Fig. 2 is a sectional front elevation thereof;

Fig. 3 is a diagrammatic view showing the manner of using the gauge in checking the spacing of holes;

Fig. 4 is a front elevation of an actuating rod;

Fig. 5 is a front elevation of a gauge body member;

Fig. 6 is an end view of said body member, looking in the direction of the arrow 6 in Fig. 5;

Fig. 7 is a front elevation, partly in section, of an adjusting nut;

Fig. 8 is a front elevation, partly in section, of an outer casing for the gauge body member;

Fig. 9 is a front elevation, partly in section, of a graduated index sleeve;

Fig. 10 is a sectional view of a cap to be described; and

Fig. 11 is a side elevation of a gauge bar.

Referring to the drawings, my improved gauge comprises a body or supporting member 20, a casing 21, a plurality of gauge-bars 22, an actuating rod 23, an adjusting nut 24, a graduated index sleeve 25, and a cap 26.

The body or supporting member 20, as shown in Figs. 5 and 6, comprises a cylindrical portion 30 having an enlarged end portion 31 provided with tapered dove-tailed guideways 32 to receive the tapered dove-tailed gauge-bars 22.

The member 30 is also provided with an axial opening 33 forming a bearing in which the actuating rod 23 is longitudinally slidable. The member 30 is axially slotted at 35 to coact with a key 36 (Fig. 2) mounted in a slot 37 in the rod 23. The rod 23 is thus free to move axially in the bearing opening 33 but is held from rotation in the member 20.

The member 20 also has a flange portion 38 adapted to be seated in a recess 40 (Fig. 8) in one end of the casing 21. This casing 21 has an enlarged flange portion 42 providing a cylindrical reference surface 43.

The flange 42 also has a number of pockets 44 corresponding in number to the number of gauge-bars 22 and adapted to receive springs 45 (Fig. 2) mounted in slidable casings 46 which are pressed outward to engage the inner ends of the gauge-bars 22.

The actuating rod 23 has an enlarged end portion or head 50 which engages the outer ends of the gauge-bars 22 and forces them inward against the pressure of the springs 45. The opposite end of the rod 23 is threaded as indicated at 52 and is provided with a removable cap 53 of slightly greater diameter than the rod.

The nut 24 is axially threaded at 60 to fit the threaded portion 52 of the rod 23, and is also provided with a reduced end portion 61, an inner recess 62, and an outer threaded recess 63. The sleeve 25 has a bearing opening 70 fitting the reduced portion 61 of the nut on which it may be angularly adjusted by inserting a spanner in a hole 72 (Fig. 2). The cap 26 (Fig. 10) excludes dirt from the working parts and is threaded to fit the outer threaded recess 63 of the nut 24 and is preferably provided with small spanner holes 75 and with a recess 76 in its inner face.

In assembling my improved gauge, the casing 21 is first pressed on the body member 20 with a force fit, so that these parts thereafter constitute in effect a single member. The springs 45 and casings 46 are then placed in the openings 44, and the gauge-bars 22 are slidably inserted in the dove-tailed recesses 32. The actuating rod 23 is then inserted in the body member 20, so that the flanged head 50 engages the outer ends of the gauge-bars 22.

The sleeve 25 is mounted on the nut 24 and the nut 24 is then screwed on to the rod 23, the cap 53 having been previously removed from the rod. The cap 53 is then replaced, and the outer cap 26 is inserted in the outer end of the nut 24.

The parts having been thus assembled, the gauge is subjected to a final grinding or finishing operation by which the gauging surfaces 80 of the gauge-bars 22 and the cylindrical surface 43 of the flange 42 are ground absolutely concentric with each other. As the dove-tailed guideways 32 for the gauge-bars 22 are formed in the enlarged end 31 of the body member 20, which member 20 is permanently and rigidly assembled with the casing 21, it follows that the gauge-bars 22 and the cylindrical surface 43 will permanently retain their concentric relation.

My improved gauge is particularly designed for measuring the center spacing between two adjacent holes in a machine part. Such use of the gauge is indicated in Fig. 3, where one gauge G has been inserted in a comparatively large hole H and a smaller gauge G' has been inserted in a smaller hole H'. Each of the gauges G and G' is first contracted until it will easily enter the associated hole, and is then expanded by turning the nut 24 until the gauge-bars 22 firmly engage the circumferential wall of the opening and definitely center the gauge therein.

The cylindrical surfaces 43 and 43ᵃ of the two gauges being of known diameter, the distance between the axes of the holes may be readily determined by inserting a gauge-block B between the surfaces 43 and 43ᵃ. The gauge block B is commonly made with a "go" portion 90 and a "no-go" portion 91. Thus the checking of the center spacing between two holes does not depend for its accuracy upon the exact diameter of the holes to be checked, although variations in diameter will be indicated by the graduations on the beveled edge of the sleeve 25 and in reference to an index line 93 on the casing 21.

To set the index, the gauge may be inserted and expanded in a hole of standard diameter, after which the sleeve 25 may be adjusted on the nut 24 to align the zero graduation on the sleeve with the fixed graduation 93, as shown in Fig. 1. Any variation in the size of holes there after gauged will be indicated by displacement of the zero line on the sleeve 25 in one direction or the other relative to the index mark 93.

The cap 53 engages a shoulder at the outer end of the member 24 to limit movement of the rod 23 in one direction and the flanged end or head 50 of the rod 23 limits movement of the rod 23 in the other direction by engagement with the end portion 31 of the body 30.

All parts of my improved gauge may be readily constructed with great accuracy, and the gauge will retain its exceptional accuracy when in use over a long period of time.

Having thus described my invention and the advantages thereof, I do not wish to be limited to the details herein disclosed, otherwise than as set forth in the claims, but what I claim is:

1. An adjustable internal gauge comprising a body member having an enlarged portion with a cylindrical reference surface formed and fixed thereon and having a plurality of dove-tailed tapered guideways formed therein fixed relative to said reference surface, a plurality of gauge-bars longitudinally slidable in said guideways and having gauging surfaces finished accurately concentric with said reference surface, and means to slide said bars simultaneously in said guideways, said parts being so constructed and arranged that said reference surface and said gauging surfaces are maintained in fixed concentric relation in all adjusted positions of said bars.

2. An adjustable internal gauge comprising a body member having a plurality of dove-tailed tapered guideways formed and fixed therein, a plurality of gauge-bars slidable longitudinally in said guideways, an actuating rod slidable but non-rotatable in said body member and having an end portion operatively engaging said gauge-bars, said rod also having a threaded portion, and a nut rotatably mounted thereon at the other end of said body member and by which said rod is longitudinally movable to adjust said gauge-bars.

3. An adjustable internal gauge comprising a body member having a plurality of dove-tailed tapered guideways formed and fixed therein, a plurality of gauge-bars slidable longitudinally in said guideways, an actuating rod slidable but non-rotatable in said body member and having an end portion operatively engaging said gauge-bars, said rod also having a threaded portion, a nut rotatably mounted thereon at the other end of said body member and by which said rod is longitudinally movable to adjust said gauge-bars, and means to limit the longitudinal movement of said actuating rod in both directions.

4. An adjustable internal gauge comprising a body member having a plurality of dove-tailed tapered guideways formed and fixed therein, a plurality of gauge-bars slidable longitudinally in said guideways, an actuating rod slidable but non-rotatable in said body member and having an end portion operatively engaging the outer ends of said gauge-bars, said rod also having a threaded portion, a nut rotatably mounted thereon at the other end of said body member and by which said rod may be longitudinally moved to adjust said gauge-bars simultaneously in one direction, and a plurality of springs mounted in said body member and each effective to move one of said gauge-bars in the opposite direction.

STANLEY W. BATH.